(12) United States Patent
Sotillo et al.

(10) Patent No.: US 6,220,206 B1
(45) Date of Patent: Apr. 24, 2001

(54) METHOD FOR PRODUCING A CAT LITTER FROM GRAIN MILLING BYPRODUCTS

(76) Inventors: Vidal E. Sotillo, 1500 Liberty La., Apt. 7, Atchison, KS (US) 66002; Wayne R. Moore, 10329 Z St., Omaha, NE (US) 68127

( * ) Notice: Subject to any disclaimer, the term of this patent is extended or adjusted under 35 U.S.C. 154(b) by 0 days.

(21) Appl. No.: 09/408,218

(22) Filed: Sep. 29, 1999

(51) Int. Cl.⁷ .................................. A01K 1/015
(52) U.S. Cl. ........................................ 119/171
(58) Field of Search .................. 119/171, 172, 119/173

(56) References Cited

U.S. PATENT DOCUMENTS

| | | | |
|---|---|---|---|
| 3,985,616 | * 10/1976 | Weaver et al. | 195/63 |
| 3,997,484 | * 12/1976 | Weaver et al. | 260/17.4 |
| 5,806,462 | * 9/1998 | Parr | 119/173 |
| 5,935,826 | * 8/1999 | Blue et al. | 435/96 |

* cited by examiner

*Primary Examiner*—Thomas Price

(57) ABSTRACT

The present invention relates to a cat litter formed from an amount of starch material and, optionally, a filler material, whereby the cat litter contains an amount of gelatinized starch equal to at least 30% by weight of each cat litter particle, and has a bulk density ranging between about 250 kg/m³ and about 300 kgm/m³, and an absorption capacity ranging between about 100% and about 140%. This invention also relates to a method of forming the cat litter, with it preferred that the cat litter be formed from a corn flour byproduct and a wheat middling byproduct.

19 Claims, No Drawings

METHOD FOR PRODUCING A CAT LITTER FROM GRAIN MILLING BYPRODUCTS

FIELD OF INVENTION

The present invention relates to a biodegradable, nondusting cat litter and a method of making such cat litter. In particular, the present invention relates to a cat litter made from at least one starch-containing byproduct of a grain milling process.

DESCRIPTION OF THE PRIOR ART

It is well known that materials known as cat litter are used as a sorbent for household pet waste, both solid and liquid. Traditionally, cat litter has been made from clay, because clay absorbs some moisture, is inexpensive, and can be easily disposed of in a trash can. Clay also clumps when wet, which makes it easier for a pet owner to selectively remove the used cat litter from the litter box. The clay clumps, however, have a relatively low cohesiveness, resulting in a tendency to crumble after drying, and to break up when removed from the litter box, thereby defeating the purpose of clumping. This is problematic because disposal of the waste is made difficult, and the likelihood of waste products remaining in the litter box is increased. This in turn increases the likelihood of foul odors emanating from the litter box as a result of the remaining waste.

Dusting is an additional problem associated with clay-based cat litters as the clay based litter typically has an amount of dust that the cat often tracks throughout a household. It is known that cat owners most frequently complain about dusting problems. Dust is created during the production process as a result of drying the clay particles and then milling the particles. The milling process causes the formation of fines or small particles, which become an integral part of the litter matrix. As such, the dust typically collects in the packaging containing the litter. This dust is then released when the package is opened by a consumer. Once the litter is poured into a litter box, further dust dissipation typically occurs when the cat walks through the litter, as a majority of the dust particles will have collected in the litter box, and as such are available for dispersion into the air. There is also a tendency for the dust to stick to the cat's fur, which can cause the soiling of furniture contacted by the cat. Further, dusting can be dangerous to the cat, as the cat can contract tuberculosis from breathing the dust. Therefore, clay litters are untidy, potentially unhealthy, and unsanitary.

Another problem associated with clay litter is that it has comparatively poor absorption capacity. This in turn allows the animal urine to pool and collect on the bottom of the litter box, which then releases ammonia. Other undesired odors result because of bacteria growth in the pooled urine.

Clay litters are also not readily biodegradable, and therefore cannot be disposed of through a sewer or septic system because the litter will typically clog the system. In turn, because clay litters are not readily biodegradable, the litter must be disposed of in a landfill, which raises environmental concerns.

In an attempt to overcome some of the problems associated with clay-based litters, alternative cat litters have been developed that are made from fibrous or cellulosic materials such as wastepaper, sawdust, or plant hulls. These materials are biodegradable and therefore provide a cat litter which is more conducive to being disposed of through a sewer or septic system; however, because cellulosic materials characteristically swell to excess when wetted, they still are likely to cause blockage of a sewer or septic system if disposed of in this manner. This again means that the litter will most likely be disposed of in a landfill. As such, an environmentally friendly cat litter is desired.

Fibrous litters also have some of the same problems as clay litters, such as dusting, poor absorption capacity, and the absence of an ability to naturally neutralize urine or eliminate odors associated with animal urine. These types of cat litter have dusting problems because the cellulosic or fibrous materials generally are not tightly bound when formed into the litter particles; as a result, the litter particles are easily broken when the cat walks through the litter. The fibrous litter particles typically have a low density, meaning the particles could become airborne and readily disperse when broken. There is also a tendency for the litter to stick to the paws or fur of the animal, which means that, like the clay based litters, tracking will be a problem. Further, many fibrous and cellulosic materials have an associated natural odor which is considered unpleasant by many consumers.

In an attempt to alleviate the dusting problem associated with cat litters, wetting additives such as surfactants and other binders have been added to cat litter products in order to bind dust and fines contained in the litter. The problem with additives, such as surfactants, is that they make the process for making the cat litter more complicated and more expensive.

In an effort to eliminate odor problems, animal litters have been developed which are made from ground alfalfa (which is a fibrous constituent). It is known that chlorophyll, indigenous to the alfalfa, will control odors. Alfalfa is known, however, to have its own profound, unpleasant odor, particularly when wet, which is believed to be undesired by consumers. In an effort to reduce the natural odor of alfalfa in cat litter products, the process of making the litter may include cooking or otherwise dehydrating the alfalfa prior to mixing with the other litter components, or aerating the particles after they have been dried. This adds to the expense and complexity of the process, and does not remove all of the odor associated with alfalfa. Further, alfalfa does not contain a natural buffering agent found in other natural grain products, such as wheat, which helps to maintain the pH of the litter once it has been wetted by the animal. The pH of the urine is not adequately neutralized by alfalfa mixtures, resulting in insufficient odor control; specifically, the effects of ammonia are not neutralized. In addition, unless a coating, such as a surfactant, is added it is believed that animal litter made from alfalfa will have dusting problems. Also, the greenish tint of the alfalfabased litter is believed to be undesirable to consumers.

The use of starch as a constituent in animal litters has been taught. Some patents, such as Fry et al., U.S. Pat. No. 3,923,005 ('005); House, U.S. Pat. No. 5,230,305 ('305); and Ducharme, et al., U.S. Pat. No. 4,727,824 ('824), have disclosed litters bound in part by starches and starch-containing materials. The '005 patent discloses mixing dried, finely-ground alfalfa with a starch-containing material, preferably wheat middling, to produce an animal litter. However, as discussed above, the use of alfalfa in animal litters presents several problems. Also, it is known that wheat middling is comprised of bran and minimal amounts of starch. Since there is a comparatively small amount of starch, it is hypothesized that the cat litter particles of the '005 patent will be insufficiently bound because not enough binding agent is present. Further, alfalfa is believed to not be very absorbent, and that the bran in the wheat middling will only absorb a small amount of moisture. Thus, the litter may not provide sufficient moisture absorption and most likely will be dusting.

The '305 patent also discloses a scoopable cat litter which uses starch-containing natural products; however, the starch is modified by incorporating liquefied gas into the tissue structure of the raw starch material until it obtains a bulk density ranging between about 500 kg/m³ and about 900 kg/m³. The density of the resulting litter is believed to be too high and the process appears to be comparatively expensive.

The '824 patent discloses the use of flour or starch as a binder for an animal litter composition. However, the litter composition is comprised of only about 2% to about 25% binder by weight. It is believed that this relatively small amount of starch component will be inadequate to sufficiently bind the litter particles together so as to provide a cohesive litter particle that resists breakage and dusting. The litter is comprised of a cellulose material, starch, and a nitrogenous absorber. The cellulose material is comprised of cellulose and pulp. Water absorption capacity is questionable because cellulose does not absorb a comparatively large amount of moisture. Also, this litter is basically comprised of at least four constituents, thereby increasing the costs. Most likely, because of the relatively minimal amount of starch, the particles will be insufficiently bound.

Sladek, U.S. Pat. No. 5,690,052 ('052) discloses the use of ground grain as animal litter. The '052 litter is comprised of between about 30% and 100% by weight ground grain, preferably hard red spring wheat. This method is undesired because the entire wheat kernel is used to form a product that does not have significant value added thereto. It is more desired to use waste portions of the wheat kernel after it has been stripped of value.

For the above reasons it is desirable to have a biodegradable cat litter which is inexpensively produced from starch-containing byproducts of grain milling processes and which can be disposed through a sewer or septic system. It is also desirable to create cat litter particles which are tightly bound so as to prevent dusting and tracking, which lack any distinct odor, and which readily form lumps when wet. Further, it is desired to have a cat litter that functions as a pH buffer.

SUMMARY OF THE INVENTION

The present invention relates to a method for forming a cat litter from starch materials comprised of an amount of starch, and the cat litter. It is preferred that the starch constituent be a byproduct of a grain milling process, as this lowers production costs and provides for a desirable way to efficiently dispose of grain milling waste materials. Any of a variety of grain byproducts can be used so long as there is a sufficient amount of starch in the grain byproducts to form a cat litter product comprised of an amount of gelatinized starch equal to at least 30% by weight of the cat litter. Additionally, the cat litter should have a bulk density ranging between about 250 kg/m³ and about 300 kg/m³ and an absorption capacity ranging between about 100% and about 140%. The cat litter should further be characterized as nondusting, biodegradable, and disposable through a sewer or septic system. Preferably, the cat litter has at least two different particle sizes.

The cat litter is at least comprised of a starch constituent, with the starch constituent preferably derived from any of a variety of grain milling byproducts. Enough starch must be added to form a cat litter particle comprised of at least 30% by weight starch. The starch constituent may be derived from any of a variety of sources, it is simply necessary to have the desired amount of starch. Starch is a carbohydrate polymer comprised of roughly 25% amylose and 75% amylopectin. Additionally, it is preferred for the cat litter to include one or more grain byproduct materials which will function as a filler. The cat litter preferably will be formed from a starch constituent and a filler constituent, both of which are preferably byproducts of grain milling processes. The starch is added because it readily absorbs moisture, thereby preventing pooling of urine when the finished litter is in use. The starch is also a binder that prevents ready breakage of the cat litter particles that have been formed from smaller size starch particle and filler constituents. Because the starch readily binds the particles that form the litter, dusting problems are minimized.

The filler is primarily added because this is an environmentally desirable way to dispose of the grain byproduct. The filler material can be any byproduct of a grain milling process, as long as it does not prevent litter formation or impart undesirable characteristics, such as a detectable odor. Preferably, the filler provides a buffering capability to neutralize the pH of the urine.

The preferred method for forming the cat litter is comprised of mixing the starch constituent, preferably a corn flour byproduct, with the filler constituent, preferably a wheat byproduct, to form a homogeneously blended grain product. The starch content of the blended grain product should be sufficient to allow for adequate binding of the cat litter particles. It is preferred for the wheat byproduct to be a wheat middling (low-grade wheat flour particles which consist essentially of starch, hemicellulose, and bran after the endosperm has been removed).

The blended grain product, comprised of the starch constituent and optionally the filler constituent, is subjected to heat, moisture, and pressure to cause gelatinization of the starch found in the starch constituent. Gelatinization causes the starch to be sticky and binds the filler constituent and the starch constituent together. It is preferred to extrude the blended grain product. Extrusion can be accomplished through any known extrusion method, so long as the parameters of the extrusion process result in an amount of starch gelatinization which adequately binds the constituents of the cat litter particle together, without causing overcooking. If overcooking occurs, then overexpansion of the extruded product results which causes the litter particles to be too light and puffy, thereby reducing the absorption capacity and increasing the potential for dusting of the litter. Preferably, at least 30% of the cat litter particles will be comprised of gelatinized starch, and the particles will have a bulk density ranging between about 250 kg/m³ and about 300 kg/mn³. This bulk density range contributes to moisture absorption as the pellets need to be somewhat porous for absorption purposes.

Once gelatinized, the extruded mixture will preferably be formed into pellets, which are then milled into smaller pellets having a rough surface and at least two different particle sizes. By having a rough surface, the absorption capacity of the pellets will be enhanced due to the increased amount of surface area exposed to the animal urine. Also, the different particle sizes will minimize the gaps between the cat litter particles, thereby preventing any excess liquid not initially absorbed from leaching to the bottom of the litter container.

The present invention addresses perceived problems of poorly bound litter particles, inadequate absorption capacity, inadequate dust control, and inadequate odor control in known commercially available cat litters. It is believed that the present invention provides a cat litter with tightly bound particles having a desirable absorption capacity, but which does not readily dust. Additionally, the present cat litter advantageously is biodegradable and comparatively inexpensive to produce. In addition, the buffering agent inherent to the filler, the wheat byproduct, also contributes to the odor control of the cat litter by neutralizing the pH of the urine, thus eliminating the need for an odor neutralizing or odor masking component. As such, the present invention effectively absorbs waste liquids while controlling odor and preventing dusting and tracking of the litter.

DETAILED DESCRIPTION

The present invention relates to a method for forming a cat litter from an amount of a starch constituent that is preferably a byproduct of a grain milling process, and the cat litter formed therefrom. More particularly, the present invention relates to a method for producing a cat litter which has a bulk density ranging between about $250 kg/m^3$ and about $300 kg/m^3$ and an absorption capacity ranging between about 100% and about 140%. The cat litter is comprised of an amount of gelatinized starch equal to at least 30% by weight of the cat litter, with the resulting cat litter being nondusting, disposable through a sewer or septic system, and biodegradable. It is advantageous to use byproducts of grain milling processes because they are typically inexpensive, biodegradable, and do not require the addition of any extra binders or sorptive products. Furthermore, use of a starch-containing byproduct of a grain milling process is advantageous because the starch can be gelatinized, resulting in a tightly bound animal litter particle, which helps to prevent dusting and also functions as an absorbent.

The method for producing the cat litter utilizes at least one starch constituent, preferably a starch-containing byproduct of a grain milling process. The more preferred method for producing the cat litter can utilize one or more starch constituents optionally blended with one or more filler grain byproducts. The composition used to form the cat litter can include a variety of filler or other constituents as long as the composition used to form the cat litter is comprised of at least 30% starch.

The preferred method for producing the cat litter is initiated by mixing an amount of starch-containing grain byproduct with an amount of filler grain byproduct. The most preferred method for producing the cat litter is initiated by mixing a starch constituent, such as corn flour, which has a starch content of up to 80% by weight and a particle size such that at least 80% of the particles pass through a 0.177 mm sieve (U.S. Std #80 mesh), with a filler grain byproduct, such as wheat middling. The constituents used to form the cat litter should have a particle size smaller than the finished cat litter particles. Corn flour is preferred because it contains a comparatively high amount of starch. This is desired because increased starch amounts result in a cat litter that is likely to be more tightly bound and will absorb a greater amount of moisture. The smaller particle size is preferred because an increased starch surface area will be exposed, which is preferred for the absorption of moisture and binding capabilities. While corn flour is preferred, other constituents which can provide similar characteristics to the cat litter can be used, such as wheat flour, for example.

The preferred filler, wheat middling, typically has a starch content of about 20% and a moisture absorption capacity of up to 30% by weight. These characteristics are preferred in a filler because they allow for the formation of a more tightly bound absorbent cat litter particle. The filler should preferably have an amount of starch because this will increase the overall total amount of starch in the cat litter particle, which is desired. Also, the additional starch, as mentioned, contributes to a more tightly bound particle. It is understood that the characteristics of the grain byproducts, the starch constituent and the filler constituent, can be varied to achieve the same result and still fall within the scope of the invention.

The starch constituent and the filler constituent can be mixed by any known mixing method sufficient to form a homogeneously blended grain product. Preferably, the grain milling byproducts are mixed in a conventional mixer at a rate of between about 30 revolutions per minute (rpm) and about 60 rpm, as this range generally provides for formation of a homogeneous blend.

The amount of starch constituent, preferably a corn flour byproduct, used should be sufficient to provide an effective amount of starch for binding the grain milling byproducts together during the formation process and for absorbing liquid waste. Preferably, the amount of corn flour byproduct used will be between about 30% and about 70% by weight of the blended grain product, as this will provide a suitable amount of starch to the cat litter. More preferably, the amount of corn flour byproduct used will be between about 50% and about 60% by weight of the blended grain product.

The amount of wheat middling used should be sufficient to provide a minimal amount of additional starch to the blended grain product, as well as a comparatively inexpensive filler material. Starch is generally more expensive than filler, so that it is preferred to have an adequate amount of starch while still minimizing the costs. Wheat middling is preferably used because it contains some starch and provides an effective buffer to neutralize the pH of the cat urine. Preferably, the amount of wheat middling used will be between about 30% and about 70% by weight of the blended grain product. This amount is dependent on the total starch in the cat litter particle. More preferably, the amount of wheat middling used will be between about 40% and about 50% by weight of the blended grain product.

The blended grain product formed from the starch constituent and the filler constituent may have any density so long as the resulting cat litter particles formed therefrom have a bulk density ranging between about $250 kg/m^3$ and about $300 kg/m^3$. Preferably, the blended grain product will have a density ranging between about $400 kg/m^3$ and about $500 kg/m^3$ upon exiting the mixer, as this has been observed to provide a suitable density for forming a cat litter of a desired density. It is preferred if the blended grain product has a moisture content ranging between about 5% and about 20% by weight, so that when placed in the gelatinization step that follows, excessive amounts of water do not have to be added.

The blended grain product is optionally preconditioned to ensure that the grain product is sufficiently moistened prior to extrusion. If performed, this step forms a conditioned grain product. As a result of preconditioning, the conditioned grain product should have a moisture content ranging between about 20% to about 22% by weight, and a temperature ranging between about 110° C. and about 115° C. Preconditioning simply allows for more efficient gelatinization in the next step of the process. Heating during preconditioning allows for a more suitable gelatinization to occur, as lesser amounts of energy in the gelatinization step are required. A conditioning cylinder can be used to precondition the grain, whereby the blended grain is heated and moistened by applying steam and water in the conditioning cylinder to the blended grain product.

The blended grain product, that has preferably been conditioned, is then gelatinized. The preferred method for gelatinizing involves extruding the grain, since extrusion typically includes the addition of heat and moisture, both of which are required for gelatinization of starch. Extrusion can be done using any method known for effectively gelatinizing up to 100% of the available starch contained in the conditioned grain product so as to cause the starch constituent and the filler constituent to bind together. Also, extrusion will cause expansion of the conditioned or blended grain product so that the resulting bulk density ranges between about 250 kg/m$^3$ and about 300 kg/m$^3$. It is preferred that between about 30% and about 100% of the available starch in the blended product be gelatinized. Depending upon the initial starch content of the blended grain product, the cat litter must contain a total amount of gelatinized starch equal to at least 30% starch.

If extrusion is used to gelatinize the starch, it is preferred if the extruder is jacketed and has four segmented heads, or stages. Treatment in stages allows the conditioned grain product to be heated and moistened at a gradual rate so as not to shock the starch. The conditioned grain product should be subjected to a temperature of at least about 65° C. in order to gelatinize between about 30% and about 100% of the starch in the conditioned grain product, as this is the threshold temperature at which gelatinization will occur. In the preferred method, the conditioned grain product is moved through the extruder barrel by a horizontal screw, which rotates at a sufficient speed and under a sufficient pressure to cause gelatinization and binding of the constituents. Preferably, the extruder conditions include a screw speed of about 350 rpm and a pressure of about 12,000 kilopascals (kPa). In the preferred method, the conditioned grain product is subjected in the first stage of the extruder to a temperature of about 60° C., a temperature in the second stage of about 78° C., a temperature in the third stage of about 90° C., and a temperature in the fourth stage of about 112° C. These conditions are preferred because they result in a cat litter particle having sufficient gelatinized starch to cause desired binding, as well as a desired bulk density and absorption capacity. However, it is understood that the extrusion conditions can be varied to achieve the same result and still fall within the scope of the invention.

Upon exiting the extruder, the extruded product can be passed through any conventionally known method sufficient to cause the extruded product to be cut or otherwise reduced in size. In the preferred method, the extruded product passes through a die located on the end of the extruder barrel, which compresses the extruded product. Next, the extruded product is subjected to a knife mechanism that cuts the extruded product into pellets as the product exits the die. The die preferably possesses at least two openings which have different diameters, so that the resulting pellets will be of different sizes, specifically, different diameters. In the most preferred method, the die possesses three rectangular-shaped openings, so that three different particle diameters are achieved. The opening or openings on the die will have a diameter ranging between about 2.54 mm and about 7.62 mm.

Once the size of the extruded product is reduced, the resulting pellets will preferably be further treated to ensure that they are of different particle sizes. If treated, the pellets are preferably broken into smaller, rough-edged particles which are desired for a commercial animal litter. Rough edges are preferred because greater moisture absorption tends to occur as more surface area is created. Milling the cat litter pellets prior to drying minimizes dusting, and produces non-uniform surface characteristics that are essential for moisture absorption. In the preferred method, the pellets are hammer milled so as to create odd-shaped particles with maximum surface area for moisture absorption.

The particles can be any size suitable for use as a cat litter, preferably, the particles pass through a sieve, having an opening of 2.0 mm (U.S. Std.#10 mesh) or less. In the most preferred method, the pellets are hammer milled into smaller pellets having a particle size such that between about 60% and about 65% of the pellets pass through an opening of 2.38 mm (U.S. Std. #8 mesh).

After extrusion, and the optional milling step, the pellets are passed to a dryer. It is preferred that the pellets be dried so that the moisture content of the pellets is reduced to between about 2% and about 10% by weight. Any conventionally known drying method can be used so long as it is sufficient to produce pellets which are suitable for use as a litter and with which the desired amount of absorption will occur. Preferably, the pellets are dried with heated air having a temperature of greater than 100° C., for a short time, about four minutes.

An additional optional step is to coat the pellets with a flavorant. This should be done prior to drying. The flavorant is designed to prevent consumption by an animal. No more than 20 parts per million (ppm) of a material which is known to be distasteful to a cat, such as Bitrix, should be added to the pellets. Preferably, an amount of Bitrix equal to about 10 ppm, per pellet will be added.

The following examples are for illustration purposes only and are not meant to limit the claims in any way.

EXAMPLES

Example 1

A method for producing a biodegradable nondusting cat litter using a filler, namely, wheat middling, and a starch constituent, namely a corn flour byproduct, was performed.

Wheat middling, characterized by an absorption capacity of 30% by weight, and a moisture content of 15% by weight, and the corn flour byproduct, characterized by a starch content of 80% by weight, a moisture content of 12.5% by weight, and a particle size whereby 84% of the particles pass through a U.S. #80 mesh sieve, were mixed to form a homogeneously blended grain product. The blended grain product had a density of about 450 kg/m$^3$, as determined by AACC84-10. The amount of wheat middling used was equal to about 60% by weight of the blended grain product, and the amount of corn flour byproduct used was equal to about 40% by weight of the blended grain product. The total amount of wheat middling used was equal to 40.9 kg, and the total amount of corn flour byproduct used was equal to 27.2 kg.

The wheat middling and corn flour byproduct were mixed in a mixer, the mixer blades rotated at a rate of about 45 rpm, and the blended grain byproduct exited the mixer at a rate of about 130 kg/hr. The moisture content of the blended product upon exiting the mixer was equal to between 10 and 12% by weight.

The blended grain byproduct was then passed to a stainless steel feed delivery system that was part of a Wenger TX-57 ((19.5:1 Length to Diameter (L/D) Twin Screw Extrusion Cooker. The feed delivery system included a model 2DDL Conditioning Cylinder.

In the Conditioning Cylinder, the blended grain byproduct was preconditioned by being subjected to moisture, in the form of steam and water, the steam being supplied to the Conditioning Cylinder at a flow rate of 8 kg/hr, and the water being supplied to the Conditioning Cylinder at a flow rate of 11 kg/hr. The Conditioning Cylinder configuration number was 89. The blended grain byproduct had a moisture content of about 22% by weight, and a temperature of about 115° C. upon exiting the Conditioning Cylinder.

The blended grain byproduct was fed from the Conditioning Cylinder to an extruder. The extruder was jacketed and heated by steam supplied to the jacket at a rate of 3 to 5 kg/hr. In the extruder, the grain was subjected to a water flow of 3 kg/hr and a pressure of 12,070 kPa. These conditions caused the starch found in the blended grain product to gelatinize. The gelatinized starch caused the corn flour byproduct particles and the wheat middling particles to bind together to form a gelatinized product. The extruder barrel had four segmented heads, a horizontal screw and shearlocks. The blended byproduct was moved through the extruder barrel by the horizontal screw rotating at a speed of 350 rpm, and was subjected in the first head to a temperature of 60° C., a temperature in the second head of 78° C., a temperature in the third head of 90° C., and a temperature in the fourth head of 112° C., which further contributed to the gelatinization of the starch found in the blended grain byproduct.

Upon reaching the end of the extruder barrel, the gelatinized product was passed through a die (die and knife configuration number 4081) possessing three rectangular-shaped openings, one opening having a diameter of 9.7 mm, the second opening having a diameter of 15.7 mm, and the third opening having a diameter of 19.8 mm. All three openings had a length of 6.0 mm. As the mixture passed through the die, a Wenger knife assembly with a hinge rotating at a speed of 2700 rpm cut the extruded product into pellets. The pellets had a moisture content of about 22% by weight and a temperature of 112° C. upon being discharged from the extruder.

After being cut, the pellets were passed to a Fitzmill with a 9.5 mm screen system, where the pellets were milled into smaller pellets having a rough surface and a particle size such that 62.2% of the pellets pass through a 2.38 mm sieve (U.S. Std. #8 mesh).

After milling, the pellets were passed to a Wenger Series IV Model 4800 Dryer, where the moisture content of the pellets was reduced to 4.0% by weight. The pellets traveled through the dryer on a stainless steel wire mesh conveyor three times, with the retention time of the pellets on the first pass being 3.0 minutes, and the retention time during the second and third passes being 4.0 minutes. The temperature in zone 1 of the dryer was 130° C., while the temperature of both zones 2 and 3 was 120° C. The fan speed of all three fans was 1230 rpm.

Example 2

The following example describes the process used to determine water absorption capacity of the pellets formed in Example 1.

A 50.0 g sample of pellets was weighed on a Sartorius, model QC 7CC E-S electronic balance and placed in a 400 ml beaker. To the beaker, 250 ml of distilled water was added so as to immerse the entire sample in the water. The sample was soaked for exactly 5 minutes.

An oven dried 0.84 mm sieve (U.S. #20 Std. mesh) wire screen was weighed on a Sartorius, model QC 7CC E-S electronic balance and laid flat in a sink. The sample-water mixture was then poured onto the wire screen and spread uniformly over the screen. The screen was then set at a 45° angle and allowed to drain for exactly 5 minutes. Any excess water around the edges of the screen was wiped off, and the screen/sample was weighed.

Each of the five samples were formed according to the method of the present invention. The water absorbed by the sample was calculated by subtracting the total weight of the dry screen and the dry pellet sample from the weight of the wet sample and screen. The water absorption capacity results were as follows:

| Sample | Weight (g) Sample | Wt. (g) Screen | Wt. Wet (g) Screen + Sample | Water Absorbed (g) | Bulk Density (kg/m³) | Lump Formation |
| --- | --- | --- | --- | --- | --- | --- |
| 1 | 50 | 493.6 | 753.0 | 209.4 | 255 | very good |
| 2 | 50 | 493.6 | 733.0 | 189.4 | 262 | very good |
| 3 | 50 | 493.6 | 701.1 | 157.6 | 280 | good |
| 4 | 50 | 494.0 | 718.3 | 174.3 | 241 | good |
| 5 | 50 | 494.0 | 722.6 | 178.6 | 259 | good |

These results indicate that the cat litter produced according to the present method consistently absorbed an amount of liquid equivalent to approximately three to four times the weight of the sample, while still retaining acceptable lump formation.

Thus, there has been shown and described a method for producing a cat litter from grain milling byproducts and the cat litter which fulfill all the objects and advantages sought therefore. It is apparent to those skilled in the art, however, that many changes, variations, modifications, and other uses and applications for the subject cat litter and method are possible, and also such changes, variations, modifications, and other uses and applications which do not depart from the spirit and scope of the invention are deemed to be covered by the invention which is limited only by the claims follow.

What is claimed is:

1. A method for producing a biodegradable, nondusting cat litter, having an absorption rate ranging between about 100% and about 140% and a bulk density ranging between about 250 kg/m³ and about 300 kg/m³, from a starch constituent, wherein said method comprises:
   (a) gelatinizing an amount of starch found in said starch constituent to form a gelatinized product comprised of an amount of gelatinized starch equal to between 30% and 100% by weight of said gelatinized product;
   (b) treating said gelatinized product so that said gelatinized product has at least two different particle sizes; and,
   (c) drying said gelatinized product to thereby form said cat litter.

2. The method of claim 1, wherein prior to said gelatinizing step said starch constituent is blended with a filler constituent comprised of starch and bran to form a blended grain product, with said blended grain product gelatinized to form said gelatinized product.

3. The method of claim 1, wherein said starch found in said starch constituent comprises between about 30% and about 100% by weight of said starch constituent.

4. The method of claim 1, wherein said starch constituent is selected from the group consisting of corn flour byproducts, wheat flour byproducts, potato flour byproducts, rice flour byproducts, and combinations thereof.

5. The method of claim 2, wherein said filler constituent is wheat middling.

6. The method of claim 2, wherein said blended grain product is comprised of an amount of said starch constituent equal to between about 30% and about 70% by weight of said blended grain product and an amount an amount of said filler constituent equal to between about 30% by weight and about 70% by weight of said blended grain product.

7. The method of claim 6, wherein said blended grain is comprised of an amount of said constituent equal to between about 40% and 50% by weight of said blended grain product and an amount of said filler constituent equal to between about 50% and about 60% by weight of said blended grain product.

8. The method of claim 1, wherein said gelatinizing step is achieved by an extrusion method.

9. The method of claim 1 wherein said gelatinized product is cut into two different particle sizes followed by passing said cut gelatinized product through a hammermill.

10. A biodegradable, nondusting cat litter comprised of a gelatinized starch equal to between about 30% and about 100% by weight of said cat litter, wherein said cat litter has an absorption capacity ranging between about 100% and about 140%, a bulk density ranging between about 250 kg/m$^3$ and about 300 kg/m$^3$, and at least two different particle sizes.

11. The cat litter of claim 10 wherein said cat litter is comprised of an amount of a starch constituent and an amount of a filler constituent.

12. The cat litter of claim 11 wherein said filler constituent is wheat middling.

13. The litter of claim 11 wherein said starch constituent has a starch content ranging between about 30% and about 100% by weight of said starch constituent.

14. The cat litter of claim 10 wherein said cat litter is comprised of an amount of wheat middling equal to between about 50% and about 60% by weight of said cat litter and an amount of corn flour byproduct equal to between about 40% and about 50% by weight of said cat litter.

15. The cat litter of claim 10 wherein said different particle sizes of said cat litter range between about 250 microns and about 2,500 microns.

16. A method of using a corn flour byproduct to form a cat litter, wherein said method is comprised of:

(a) processing said corn flour byproduct under a sufficient amount of heat, pressure, and moisture sufficient to cause gelatinization of available starch in said corn flour byproduct thereby causing formation of a gelatinized product comprised of an amount of gelatinized starch equal to at least 30% by weight of said gelatinized product;

(b) treating said gelatinized product so as to form pellets having a bulk density ranging between about 250 kg/m$^3$ and about 300 kg/m$^3$; and, (c) drying said pellets to form said cat litter, with said cat litter having at least two different particle sizes and an absorption capacity ranging between about 100% and about 140%.

17. The method of claim 16 wherein said corn flour byproduct is first blended with a wheat flour byproduct to form a blended grain product prior to being processed.

18. The method of claim 16 wherein said processing step is an extrusion method.

19. The method of claim 16 wherein said different particle sizes of said cat litter range between about 250 microns and about 2,500 microns.

* * * * *

UNITED STATES PATENT AND TRADEMARK OFFICE
CERTIFICATE OF CORRECTION

PATENT NO. : 6,220,206 B1
DATED : April 24, 2001
INVENTOR(S) : Sotillo et al.

It is certified that error appears in the above-identified patent and that said Letters Patent is hereby corrected as shown below:

<u>Column 10,</u>
Line 32, change "limited only by the claims follow" to -- limited only by the claims which follow --

Signed and Sealed this

Twentieth Day of November, 2001

*Attest:*

*Attesting Officer*

NICHOLAS P. GODICI
*Acting Director of the United States Patent and Trademark Office*